(12) United States Patent
Hakamada

(10) Patent No.: US 9,232,110 B2
(45) Date of Patent: Jan. 5, 2016

(54) IMAGE PROCESSING APPARATUS EQUIPPED WITH AUTO-COLOR MODE

(71) Applicant: RISO KAGAKU CORPORATION, Tokyo (JP)

(72) Inventor: Junichi Hakamada, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/574,857

(22) Filed: Dec. 18, 2014

(65) Prior Publication Data

US 2015/0181081 A1  Jun. 25, 2015

(30) Foreign Application Priority Data

Dec. 25, 2013  (JP) ................................. 2013-266664

(51) Int. Cl.
| | |
|---|---|
| *H04N 1/46* | (2006.01) |
| *H04N 1/56* | (2006.01) |
| *H04N 1/48* | (2006.01) |
| *H04N 1/50* | (2006.01) |
| *G06K 15/10* | (2006.01) |

(52) U.S. Cl.
CPC ................ *H04N 1/46* (2013.01); *G06K 15/102* (2013.01); *H04N 1/48* (2013.01); *H04N 1/50* (2013.01); *H04N 1/56* (2013.01); *H04N 2201/0082* (2013.01); *H04N 2201/0093* (2013.01); *H04N 2201/0094* (2013.01)

(58) Field of Classification Search
CPC ......... H04N 1/46; H04N 1/56; H04N 1/2369; H04N 2201/33378
USPC ........................... 358/1.9, 2.1, 1.13, 518, 524
See application file for complete search history.

(56) References Cited

U.S. PATENT DOCUMENTS 5,576,849 A * 11/1996 Murakami ............... H04N 1/54
  358/2.1
5,786,906 A *  7/1998 Shishizuka .................. 358/500

FOREIGN PATENT DOCUMENTS

JP  05-284372  10/1993

* cited by examiner

*Primary Examiner* — Jamares Q Washington
(74) *Attorney, Agent, or Firm* — Greenblum & Bernstein, P.L.C.

(57) ABSTRACT

A determining unit determines for each of pages which one of a color output or a monochrome output to perform, based on a color intensity of determination image data containing generated color pixel data and monochrome pixel data on each of pixels generated by a determination image data generating unit based on print job data. An image generating unit generates color image data by extracting the color pixel data on each of the pixels for each of color components upon determination that the color output is to be performed, and generates monochrome image data by extracting the monochrome pixel data on each of the pixels upon determination that the monochrome output is to be performed.

4 Claims, 4 Drawing Sheets

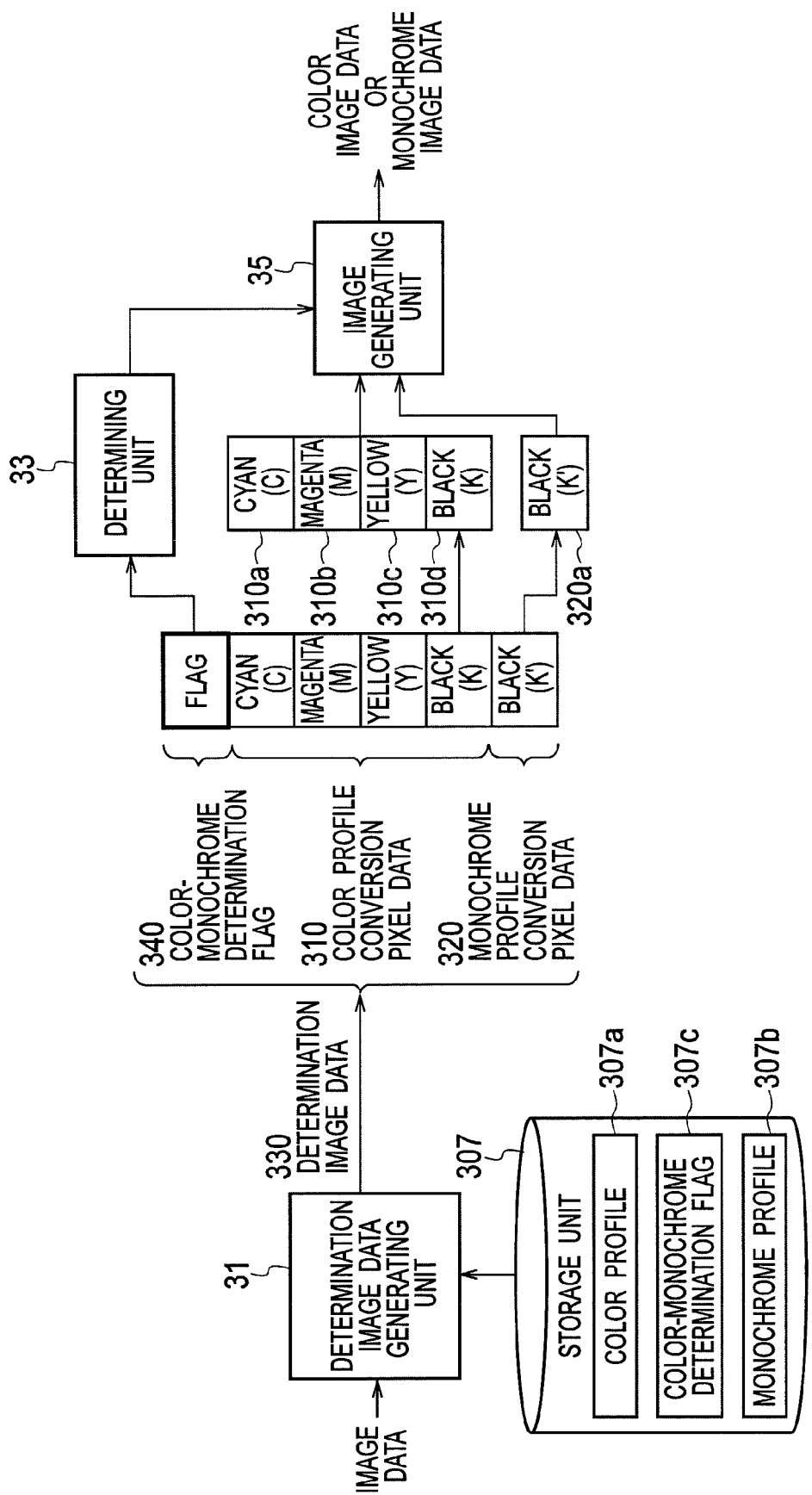

IMAGE PROCESSING APPARATUS EQUIPPED WITH AUTO-COLOR MODE

CROSS REFERENCE TO RELATED APPLICATION

This application is based upon and claims the benefit of priority from the prior Japanese Patent Application No. 2013-266664, filed on Dec. 25, 2013, the entire contents of which are incorporated herein by reference.

BACKGROUND

1. Technical Field

This disclosure is related to an image processing apparatus equipped with an auto-color mode.

2. Related Art

For printing apparatuses such as inkjet recording apparatuses, and image processing apparatuses such as full-color copying machines, auto-color mode has been known in which the apparatus automatically determines whether an original copy is color or monochrome. When this auto-color mode is selected, the apparatus switches the image forming mode (color mode/monochrome mode) based on whether an original copy to be printed or copied is color or monochrome.

As original copy color determination for determining whether an original copy is color or monochrome, there has been known automatic determination through an automatic color selection (ACS) process. In this ACS process, the target of the determination is image data contained in print job data supplied from a computer through a network, and image data inputted by reading an image on an original copy with a scanner or the like. First, pixel color determination is performed to determine whether pixels forming the determination target image data are color pixels or monochrome pixels. Then, by using the results of the determination, it is determined whether the original copy is color or monochrome. Thereafter, color or monochrome printing is performed according to the result of the determination.

Japanese Patent Application Publication No. Hei 5-284372 proposes a color image processing apparatus configured to convert the color of each pixel read by color image reading means into saturation information, then average the saturation information at each of multiple areas on the color image, detect the greatest value of the averaged saturation information for each scan line of the image, and finally perform a histogram analysis. In this color image processing apparatus, the number of colors present in the image is determined from the histogram of the greatest saturation values, and the original copy is determined as monochrome when the number of colors is one, while the original copy is determined as color when the number of colors is more than one.

SUMMARY

Meanwhile, in the color image processing apparatus described in Japanese Patent Application Publication No. Hei 5-284372, the determination process requires time since the determining of whether an original copy is color or monochrome involves converting the color of each pixel read by the color image reading means into saturation information or the like by using a color conversion table.

To solve this, one may consider performing pre-flight check including: generating a thumbnail image by reducing the size of the read image; converting this thumbnail image by using a color conversion table for color operation; determining whether the original copy is color or monochrome based on the converted data; performing color conversion by using the color conversion table for color operation if the original copy is determined as color; and performing color conversion by using a conversion table for monochrome operation if the original copy is determined as monochrome.

However, performing such pre-flight check requires generating a thumbnail image in advance. To do so, it is necessary to perform a developing process (raster image processing; hereinafter referred to as a RIP process) on the pixel values of all the pixels corresponding to the print resolution. Then, a developing process is performed again for the image data for printing. Thus, it takes time to output the print image data.

An object of the present invention is to provide an image processing apparatus capable of avoiding a situation where it takes time to output print image data when an auto-color mode is selected.

An image processing apparatus in accordance with some embodiments includes: a storage unit configured to store a color profile for generating color pixel data on each of pixels based on print job data containing an instruction for a printing apparatus to perform an auto-color output for performing a color output or a monochrome output, and a monochrome profile for generating monochrome pixel data on each of the pixels based on the print job data; a determination image data generating unit configured to generate color pixel data on each of the pixels for each of color components based on the print job data by using the color profile stored in the storage unit, generate monochrome pixel data on each of the pixels based on the print job data by using the monochrome profile stored in the storage unit, and generate determination image data containing the generated color pixel data on each of the pixels and the generated monochrome pixel data on each of the pixels; a determining unit configured to determine for each of pages which one of the color output or the monochrome output to perform, based on a color intensity of the determination image data generated by the determination image data generating unit; and an image generating unit configured to generate color image data for the color output by the printing apparatus by extracting the color pixel data on each of the pixels for each of the color components generated by the determination image data generating unit upon determination by the determining unit that the color output is to be performed, and configured to generate monochrome image data for the monochrome output by the printing apparatus by extracting the monochrome pixel data on each of the pixels generated by the determination image data generating unit upon determination by the determining unit that the monochrome output is to be performed.

An image processing apparatus in accordance with some embodiments includes: a printing unit; a job data receiving unit configured to receive print job data containing an instruction for the printing unit to perform auto-color output for performing a color output or a monochrome output; a storage unit configured to store a color profile for generating color pixel data on each of pixels based on the print job data and a monochrome profile for generating monochrome pixel data on each of the pixels based on the print job data; a determination image data generating unit configured to generate color pixel data on each of the pixels for each of color components based on the print job data by using the color profile stored in the storage unit, generate monochrome pixel data on each of the pixels based on the print job data by using the monochrome profile stored in the storage unit, and generate determination image data containing the generated color pixel data on each of the pixels and the generated monochrome pixel data on each of the pixels; a determining unit configured to determine for each of pages which one of the color output or the monochrome output to perform, based on a color intensity of the determination image data generated by the determination image data generating unit; and an image generating unit configured to generate color image data for the color output by the printing unit by extracting the color pixel data on each of the pixels for each of the color components generated by the determination image data generating unit upon determination by the determining unit that the color output is to be performed, and configured to generate monochrome image data for the monochrome output by the printing unit by extracting the monochrome pixel data on each of the pixels generated by the determination image data generating unit upon determination by the determining unit that the monochrome output is to be performed; and a print controlling unit configured to drive the printing unit to perform the color output or the monochrome output based on the color image data or the monochrome image data generated by the image generating unit.

According to the above configurations, it is possible to avoid a situation where a developing process (RIP process) is performed for all the pixels for pre-flight check involving generation of a thumbnail image by reducing the size of the read image in advance, and then another developing process (RIP process) is performed for all the pixels again for the second time. Thus, it is possible to avoid a situation where it takes time to output color image data or monochrome image data.

Moreover, while one developing process (RIP process) is being performed, the color pixel data on each pixel and the monochrome pixel data on each pixel can be generated by using the color profile and the monochrome profile, and any of these pieces of data can be used according the result of the color-monochrome determination based on the color intensity (whether the number of color pixels is greater than a predetermined number). Thus, it is possible to avoid a situation where it takes time to generate a color image or a monochrome image based on a determination result.

For each of the pages, the determining unit may be configured to: for each of the pixels, make a comparison between pieces of color pixel data of the color components contained in the determination image data, and determine that the pixel is a color pixel upon at least two of pixel values of the color components being different from each other, and determine that the pixel is a monochrome pixel upon the pixel values of the color components being equal to each other; and determine that the color output is to be performed upon excess of a number of the color pixels over a threshold.

According to the above configuration, whether the image is a color image or a monochrome image is determined based on the number of color pixels. In this way, whether the image is a color image or a monochrome image can be reliably determined without having to generate a thumbnail image.

The storage unit may be configured to store the color profile, the monochrome profile, and color-monochrome determination flags in association with each other, the color-monochrome determination flags each indicting whether the color profile is a color pixel or a monochrome pixel. The determination image data generating unit may be configured to extract, from the storage unit, the color-monochrome determination flags corresponding to the generated color pixel data on the pixels, and generate the determination image data containing the extracted color-monochrome determination flags in addition to the generated color pixel data on the pixels and the generated monochrome pixel data on the pixels. The determining unit may be configured to determine for each of the pages that the color output is to be performed upon excess of a number of color-monochrome determination flags each representing the color pixel among the color-monochrome determination flags contained in the determination image data generated by the determination image data generating unit over a threshold.

According to the above configuration, it is not necessary to determine for each page which one of a color image and a monochrome image to output, based on the color pixel data on each pixel. Thus, the time required for the determination process can be shortened. Accordingly, the time required to output print image data can be shortened further.

BRIEF DESCRIPTION OF DRAWINGS

FIG. 4 is a diagram schematically describing the operation of an image processing unit included in an image processing apparatus according to Embodiment 2.

DETAILED DESCRIPTION

Figure 1:
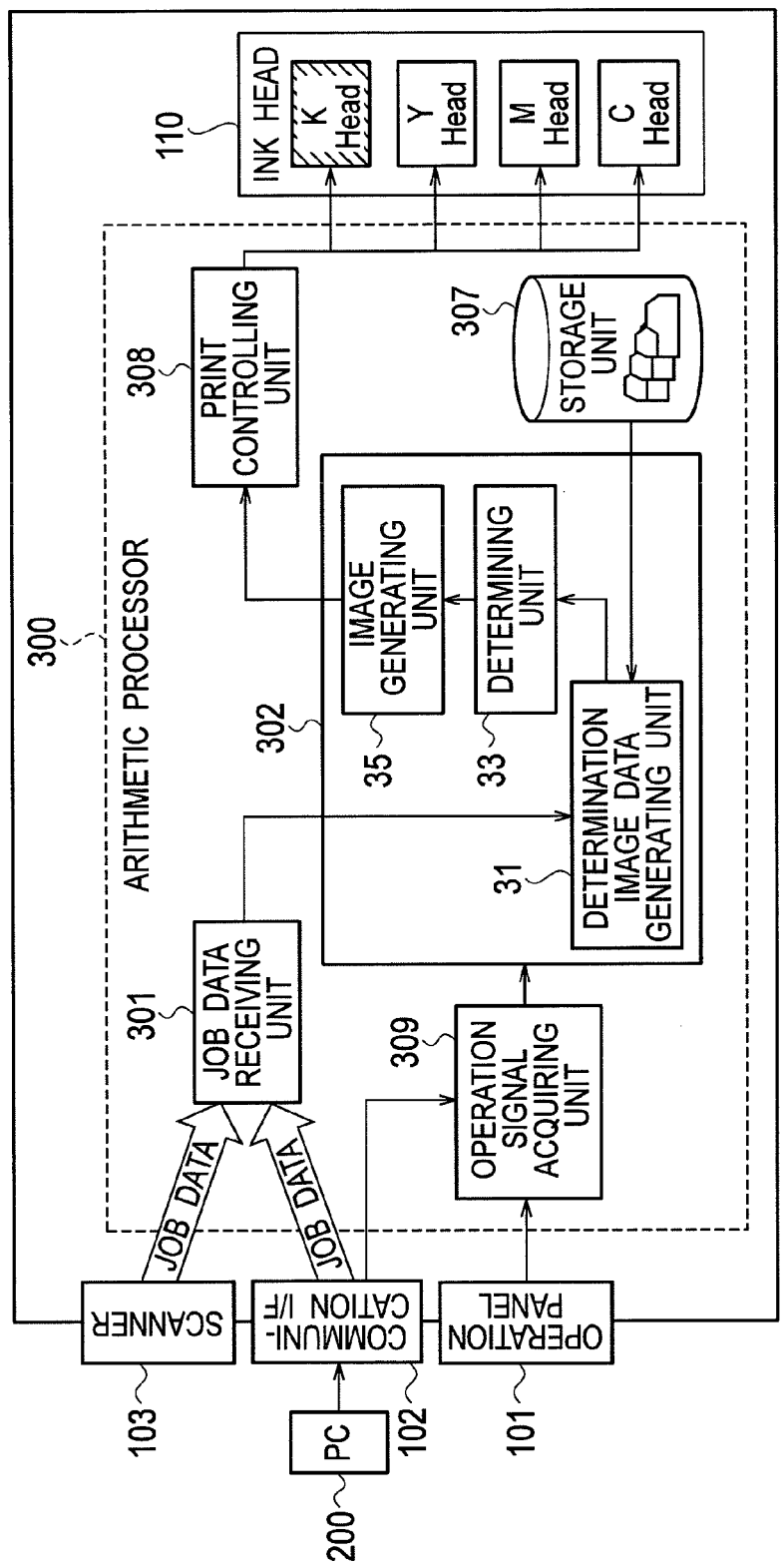
FIG. 1 is a diagram illustrating the entire configuration of an image processing apparatus according to Embodiment 1 of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

In the following embodiments, cases where an image processing apparatus of the present invention is applied to an inkjet recording apparatus will be described. Note that although cases where the present invention is applied to printing processes in an inkjet recording apparatus will be mainly described in these embodiments, the present invention is not limited to these cases. The present invention is applicable to, for example, recording apparatuses using various printing methods such as stencil printing machine, thermal recording apparatuses, and thermal-transfer recording apparatuses, as well as any recording apparatuses such as copying machines, facsimiles, and multifunctionals thereof configured to read original copies and output image data inputted from an external device.

Embodiment 1

An image processing apparatus 100 according to Embodiment 1 of the present invention will be described.

Entire Configuration of Image Processing Apparatus

FIG. 1 is a diagram illustrating the entire configuration of the image processing apparatus 100 according to Embodiment 1.

The image processing apparatus 100 includes inkjet heads (printing unit) 110 and an arithmetic processor 300.

Each inkjet head 110 is configured to eject black (K) or color (C, M, Y) ink through nozzles onto a transported paper sheet to perform printing on a line basis.

The arithmetic processor 300 is an arithmetic processing module including, for example: a processor such as a CPU or a digital signal processor (DSP); a storage unit formed of a hard disk, a semiconductor memory, or the like; and hardware such as other electronic circuits, software such as programs having functions thereof, or a combination of these. This arithmetic processing module is configured to build various virtual functional modules by loading and executing appropriate programs and to perform processes for image data, controls the operations of components, and perform various processes for user operations by using the built functional modules. In particular, in this embodiment, the arithmetic processor 300 has a function of determining whether image data representing an image is a color image or a monochrome image.

An operation panel 101 and a personal computer 200 to be used by the user are connected to the arithmetic processor 300. The arithmetic processor 300 can receive user instructions and setting operations from the operation panel 101 and the personal computer 200.

In this embodiment, for its functions, the arithmetic processor 300 includes a job data receiving unit 301, an image processing unit 302, a storage unit 307, a print controlling unit 308, and an operation signal acquiring unit 309.

The job data receiving unit 301 is a module configured to, for example, receive print job data written in a page description language or the like and to pass data contained in the received print job data to the image processing unit 302. Specifically, the job data receiving unit 301 receives print job data containing image data from a scanner 103, which is a device configured to take in image data, or from the personal computer 200 connected thereto through a communication interface 102, extracts the image data, and sends it to the image processing unit 302. The image data which this job data receiving unit 301 receives is data representing letters and pictures, and is presented, for example, as data in a vector format and/or data such as outline fonts. Moreover, the color space is presented using the L*a*b* color system.

The communication interface 102 is a module configured to send and receive data in the form of packets. Print job data and operation signals are received from the personal computer 200 used by the user through the communication interface 102. Note that the communication in this case includes, for example, communication through an intranet (network within an organization) based on 10BASE-T, 100BASE-TX, or the like, and communication through a LAN such as network within a home, as well as close-range communication such as infrared communication.

The operation signal acquiring unit 309 is a module configured to receive user operation signals from the operation panel 101 or from the personal computer 200 connected thereto through the communication interface 102, analyze the received operation signals, and cause other modules to perform processes corresponding to the user operations.

The storage unit 307 is formed, for example, of a hard disk drive and configured to store a profile which is a color profile for color conversion into a color image and a monochrome profile for color conversion into a monochrome image.

The image processing unit 302 is an arithmetic processing device configured to perform digital signal processing specialized in image processing, and is a module configured to perform conversion and the like on image data necessary for printing, and also to determine whether the image data is a color image or a monochrome image. In particular, in this embodiment, the image processing unit 302 includes a determination image data generating unit 31, a determining unit 33, and an image generating unit 35.

The determination image data generating unit 31 is configured to generate color pixel data (color profile conversion pixel data) on each pixel for each color component based on print job data transmitted from the job data receiving unit 301 by using the color profile stored in the storage unit 307. The determination image data generating unit 31 is also configured to generate monochrome pixel data (monochrome profile conversion pixel data) on each pixel based on the print job data by using the monochrome profile stored in the storage unit 307. Furthermore, the determination image data generating unit 31 is configured to generate determination image data containing the color pixel on each pixel and the monochrome pixel data on each pixel thus generated.

The determining unit 33 is configured to determine, for each page, which one of a color image and a monochrome image to output (i.e. which one of color output and monochrome output to perform), based on the color intensity of the determination image data generated by the determination image data generating unit 31.

The image generating unit 35 is configured to generate color image data by extracting the color pixel data (color profile conversion pixel data) on each pixel for each color component generated by the determination image data generating unit 31, and send signals to the print controlling unit 308 (output the color image data to the print controlling unit 308) if the determining unit 33 determines that a color image is to be outputted. The image generating unit 35 is configured, on the other hand, to generate monochrome image data by extracting monochrome pixel data (monochrome profile conversion pixel data) on each pixel, and send signals to the print controlling unit 308 (output the monochrome image data to the print controlling unit 308) if the determining unit 33 determines that a monochrome image is to be outputted.

The print controlling unit 308 is configured to control the drive of the inkjet head 110 of each color based on the signals received from the image processing unit 302, to thereby control the entire image forming process.

Details of Image Processing Unit

Figure 2:
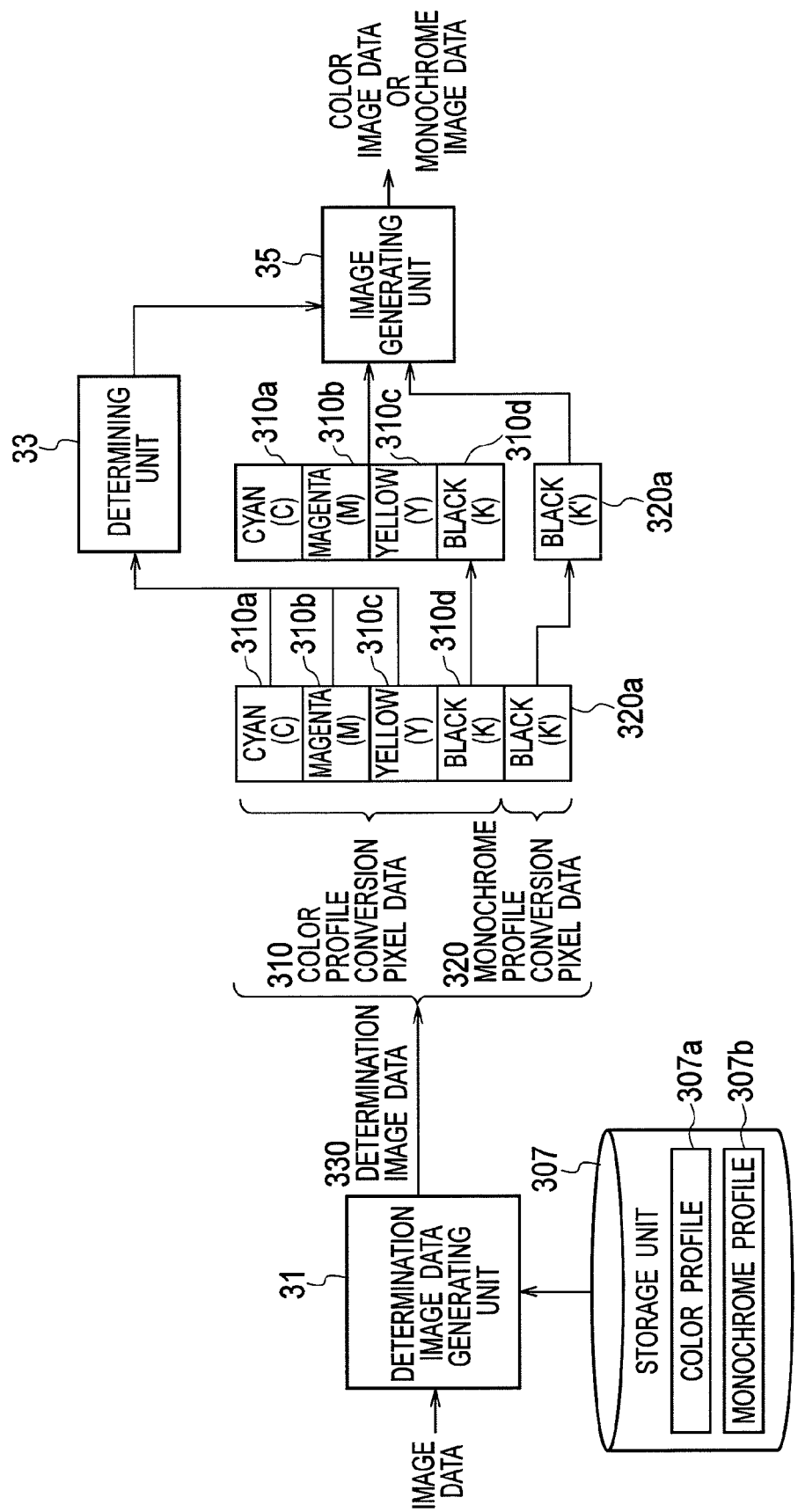
FIG. 2 is a diagram schematically describing the operation of an image processing unit included in the image processing apparatus according to Embodiment 1.

FIG. 2 is a diagram schematically illustrating the operation of the image processing unit 302 included in the image processing apparatus 100.

As illustrated in FIG. 2, the determination image data generating unit 31 performs a RIP process (color conversion and bitmap conversion) on print job data by using a profile containing a color profile 307a and a monochrome profile 307b stored in the storage unit 307. As a result, the determination image data generating unit 31 generates color profile conversion pixel data 310 and monochrome profile conversion pixel data 320 in a bitmap format from data in the vector format and/or data such as outline fonts. Note that the color profile 307a and the monochrome profile 307b are stored as different profiles in the storage unit 307 in FIG. 2 for the sake of explanation, and the present invention is not limited to this case. For example, the color profile 307a and the monochrome profile 307b may be stored as one profile in the storage unit 307.

Then, the determination image data generating unit 31 generates determination image data 330 by combining the color profile conversion pixel data 310 and monochrome profile conversion pixel data 320 thus generated.

In the example illustrated in FIG. 2, the color profile conversion pixel data 310 contains C pixel data 310a representing the pixel value of C (cyan), M pixel data 310b representing the pixel value of M (magenta), Y pixel data 310c representing the pixel value of Y (yellow), and K pixel data 310d representing the pixel value of K (black).

The monochrome profile conversion pixel data 320 contains K' pixel data 320a representing the pixel value of K' (black). Note that the K pixel data 310d is the pixel value of black after color conversion using the color profile 307a, while the K' pixel data 320a is the pixel value of black after color conversion using the monochrome profile 307b. Thus, the values are different from each other, as a matter of course.

The determining unit 33 determines whether the pixel is a color pixel or a monochrome pixel based on the C pixel data 310a, the M pixel data 310b, and the Y pixel data 310c of the color profile conversion pixel data 310 in the determination image data 330 generated by the determination image data generating unit 31. Specifically, the determining unit 33 determines that the pixel is a color pixel if at least two of the pixel values of the C pixel data 310a, the M pixel data 310b, and the Y pixel data 310c are different from each other. On the other hand, the determining unit 33 determines that the pixel is a monochrome pixel if the pixel values of the C pixel data 310a, the M pixel data 310b, and the Y pixel data 310c are equal to each other.

Then, the determining unit 33 calculates the number of color pixels for each page, and determines that a color image is to be outputted for the page if the number of color pixels thus calculated exceeds a threshold.

If the determining unit 33 determines that a color image is to be outputted, the image generating unit 35 generates color image data by extracting the C pixel data 310a, the M pixel data 310b, the Y pixel data 310c, and the K pixel data 310d on each pixel, and converting them into drop data based on gradations ranging from 0 to 5 so that the inkjet heads 110 can eject the inks.

If the determining unit 33 determines that a monochrome image is to be outputted, the image generating unit 35 generates monochrome image data by extracting the K' pixel data 320a on each pixel and converting them into drop data based on the gradations ranging from 0 to 5 so that the inkjet head 110 can eject the ink.

Operation of Image Processing Apparatus

Figure 3:
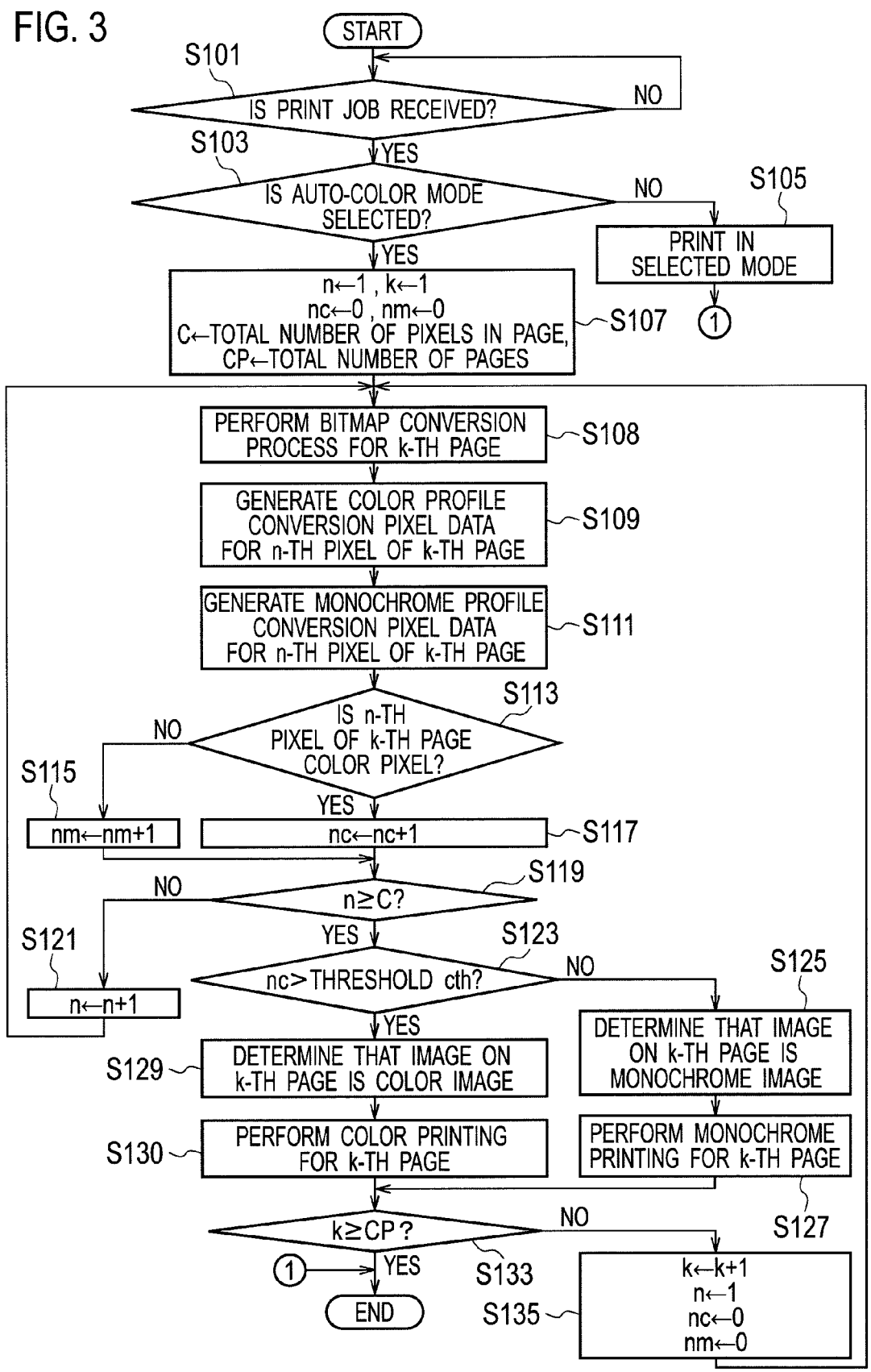
FIG. 3 is a flowchart illustrating the sequence of operations by the image processing unit included in the image processing apparatus according to Embodiment 1.

FIG. 3 is a flowchart illustrating the sequence of operations by the image processing unit 302 included in the image processing apparatus 100.

As illustrated in FIG. 3, the image processing unit 302 determines whether or not print job data containing image data is received from the scanner 103 or from the connected personal computer 200 through the communication interface 102 (step S101). If determining in step S101 that print job data containing image data is received (S101; YES), the image processing unit 302 determines from header data contained in the print job data whether or not an auto-color mode is selected as a color-monochrome setting, among a color mode for outputting a color image, a monochrome mode for outputting a monochrome image, and the auto-color mode for automatically determining whether the image is a color image or a monochrome image (step S103).

If determining in step S103 that the auto-color mode is not selected (i.e. the color mode or the monochrome mode is selected) (step S103; NO), the image processing unit 302 performs a RIP process (a color conversion process and a bitmap conversion process) based on the selected mode by using a color conversion table for that mode to thereby generate color image data or monochrome image data, and sends signals to the print controlling unit 308. Upon receipt of the signals from the image processing unit 302, the print controlling unit 308 causes the inkjet heads 110 to eject the inks based on the generated color or monochrome image data to perform color or monochrome printing on a transported paper sheet (step S105).

On the other hand, if the auto-color mode is selected in step S103 (step S103; YES), the image processing unit 302, as initial values, assigns "1" to a pixel counter n, assigns "1" to a page counter k, assigns "0" to a color pixel counter nc, assigns "0" to a monochrome pixel counter nm, inputs the total number of pixels in a page contained in a header of the print job data into a variable C, and assigns the total number of pages contained in the header of the print job data to a variable CP (step S107).

Then, the determination image data generating unit 31 converts data in the vector format and/or data such as outline fonts in the supplied image data (e.g. PDL data generated by a printer driver) into data in the bitmap format (step S108).

Then, the determination image data generating unit 31 generates color profile conversion pixel data 310 by performing color conversion using the color profile 307a stored in the storage unit 307 on the n-th pixel of the k-th page in the image data converted in the bitmap format (step S109).

Then, the determination image data generating unit 31 generates monochrome profile conversion pixel data 320 by performing color conversion using the monochrome profile 307b stored in the storage unit 307 on the n-th pixel of the k-th page in the image data converted in the bitmap format (step S111). The color profile conversion pixel data 310 and the monochrome profile conversion pixel data 320 thus generated are combined to generate determination image data 330. Specifically, color profile conversion pixel data being data on C, M, Y, and K and monochrome profile conversion pixel data being data on K' are generated as determination image data. It is to be noted that the color conversion processes in steps S109 and S111 are performed after the bitmap conversion process in step S108 is performed in the above example for the sake of explanation; the bitmap conversion process in step S108 and the color conversion processes in steps S109 and S111 are performed simultaneously.

Then, the determining unit 33 determines whether or not the n-th pixel of the k-th page is a color pixel (step S113). Specifically, the determining unit 33 determines that the n-th pixel of the k-th page is a color pixel if at least two of the pixel values of the C pixel data 310a, the M pixel data 310b, and the Y pixel data 310c on the n-th pixel of the k-th page are different from each other. On the other hand, the determining unit 33 determines that the n-th pixel of the k-th page is a monochrome pixel if the pixel values of the C pixel data 310a, the M pixel data 310b, and the Y pixel data 310c on the n-th pixel of the k-th page are equal to each other.

If determining in step S113 that the pixel is a monochrome pixel (step S113; NO), the determining unit 33 increments the monochrome pixel counter nm by "1" (step S115). If determining in step S113 that the pixel is a color pixel (step S113; YES), the determining unit 33 increments the color pixel counter nc by "1" (step S117).

Then, if the pixel counter n is less than the total number of pixels C (step S119; NO), the determining unit 33 shifts the process back to step S108, and repeats the same operations to determine for every remaining pixel in the k-th page whether the pixel is a color pixel or a monochrome pixel.

If it is determined in step S119 that the pixel counter n is equal to or greater than the total number of pixels C (step S119; YES), the determining unit 33 determines whether or not the color pixel counter nc has exceeded a threshold cth (step S123). Here, a given number of color pixels based on which to determine the image as a color image is set to the threshold cth. For example, assuming that "0" is set to the threshold cth, the image on the page is determined as a color image by the presence of even one color pixel.

If determining in step S123 that the color pixel counter nc has exceeded the threshold cth (step S123; YES), the determining unit 33 determines that the image on the k-th page is a color image (step S129). Then, the image generating unit 35 generates color image data from the color profile conversion pixel data on each pixel in the determination image data on the k-th page, and sends signals to the print controlling unit 308. Upon receipt of the signals from the image generating unit 35, the print controlling unit 308 controls the inkjet heads 110 to print the color image (step S130).

On the other hand, if determining in step S123 that the color pixel counter nc is equal to or less than the threshold cth (step S123; NO), the determining unit 33 determines that the image on the k-th page is a monochrome image (step S125). Then, the image generating unit 35 generates monochrome image data from the monochrome profile conversion pixel data on each pixel in the determination image data on the k-th page, and sends signals to the print controlling unit 308. Upon receipt of the signals from the image generating unit 35, the print controlling unit 308 controls the inkjet head 110 to print the monochrome image (step S127).

Then, if the page counter k is equal to or greater than the total number of pages CP (step S133; YES), the determining unit 33 ends the process. On the other hand, if the page counter k is less than the total number of pages CP (step S133; NO), the determining unit 33 increments the page counter k by "1" and assigns "1," "0," and "0" to the pixel counter n, the color pixel counter nc, and the monochrome pixel counter nm as initial values, respectively, (step S135) in order to determine whether the image on the next page is a color image or a monochrome image. Thereafter, the determining unit 33 shifts the process back to step S108 and repeats the same operations to determine for every remaining page in the print job data whether the image is a color image or a monochrome image.

As described above, in the image processing apparatus 100 according to Embodiment 1, the determination image data generating unit 31 generates color pixel data (color profile conversion pixel data) on each pixel for each color component based on print job data by using the color profile, and also generates monochrome pixel data (monochrome profile conversion pixel data) on each pixel based on print job data by using the monochrome profile, and further generates determination image data containing the color pixel data on each pixel and the monochrome pixel data on each pixel. The determining unit 33 determines for each page which one of a color image and a monochrome image to output, based on the color intensity of the determination image data generated by the determination image data generating unit 31. If the determining unit 33 determines that a color image is to be outputted, the image generating unit 35 generates color image data by extracting the color pixel data (color profile conversion pixel data) on each pixel for each color component. If the determining unit 33 determines that a monochrome image is to be outputted, the image generating unit 35 generates monochrome image data by extracting the monochrome pixel data (monochrome profile conversion pixel data) on each pixel.

This configuration avoids a situation where a developing process (RIP process) is performed for all the pixels due to pre-flight check requiring generation of a thumbnail image by reducing the size of the read image in advance, and then another developing process (RIP process) is performed for all the pixels again for the second time. Thus, it is possible to avoid a situation where it takes time to output print image data.

Moreover, while one RIP process is being performed, the color profile conversion pixel data on each pixel and the monochrome profile conversion pixel data on each pixel can be generated by using the color profile and the monochrome profile, and any of these pieces of data can be used according to the result of the color-monochrome determination based on the color intensity (whether the number of color pixels is greater than a predetermined number). Thus, it is possible to avoid a situation where it takes time to generate a color image or a monochrome image based on a determination result.

Thus, the image processing apparatus 100 according to Embodiment 1 can avoid a situation where it takes time to output print image data when the auto-color mode is selected.

Note that in the image processing apparatus 100 according to Embodiment 1, the determination image data generating unit 31 and the determining unit 33 repeat the operations in steps S108 to S121 until the pixel counter n reaches or exceeds the total number of pixels C as illustrated in the flowchart in FIG. 3, but the present invention is not limited to this case. For example, if the color pixel counter nc after being incremented by "1" in step S117 is determined as having exceeded the threshold cth (threshold cth=1), the process may be shifted to step S129 without determining for every remaining pixel whether the pixel is a color pixel or a monochrome pixel.

Embodiment 2

In the image processing apparatus 100 according to Embodiment 1, which one of a color image and a monochrome image to output is determined for each page based on the color profile conversion pixel data contained the determination image data.

In an image processing apparatus 100A according to Embodiment 2, which one of a color image and a monochrome image to output is determined for each page based on color-monochrome determination flags contained in determination image data.

FIG. 4 is a diagram schematically describing the operation of an image processing unit 302 included in the image processing apparatus 100A according to Embodiment 2. Note that the configuration of the image processing apparatus 100A according to Embodiment 2 is the same as the configuration of the image processing apparatus 100 according to Embodiment illustrated in FIG. 1, and description thereof is therefore omitted.

As illustrated in FIG. 4, the storage unit 307 stores, as a profile, a color profile 307a for generating color pixel data on each pixel based on print job data, a monochrome profile 307b for generating monochrome pixel data on each pixel based on the print job data, and color-monochrome determination flags 307c each indicating whether the pixel is a color pixel or a monochrome pixel, in association with each other. The color-monochrome determination flags 307c are generated at the same time as when the color profile 307a is generated. For example, in a case where the color profile 307a contains a color conversion table from the L*a*b* color system into a CMYK color system, the values of the L*a*b* color system can be used to determine whether a pixel is a color pixel or a monochrome pixel. Specifically, in a case where the saturation is equal to or lower than a predetermined value (e.g. the a* value and the b* value are each less than a predetermined value), the pixel can be determined as a monochrome pixel. Each set of values of the L*a*b* color system is stored in association with a color-monochrome determination flag 307c indicating the result of determination of whether the set of values represents a color pixel or a monochrome pixel.

The determination image data generating unit 31 performs a RIP process (color conversion and bitmap conversion) on the print job data by using the profile containing the color profile 307a and the monochrome profile 307b, to thereby generate color profile conversion pixel data 310 and monochrome profile conversion pixel data 320 in a bitmap format from data in a vector format and/or data such as outline fonts.

Further, the determination image data generating unit 31 extracts color-monochrome determination flags 340 corresponding to the color profile conversion pixel data 310 obtained by the color conversion, from the profile stored in the storage unit 307.

Then, the determination image data generating unit 31 generates determination image data 330 by combining the color profile conversion pixel data 310 and the monochrome profile conversion pixel data 320 thus generated and the color-monochrome determination flags 340.

In the example illustrated in FIG. 4, the color-monochrome determination flags 340 are contained in the determination image data 330.

The color profile conversion pixel data 310 contains C pixel data 310a representing the pixel value of C (cyan), M pixel data 310b representing the pixel value of M (magenta), Y pixel data 310c representing the pixel value of Y (yellow), and K pixel data 310d representing the pixel value of K (black).

The monochrome profile conversion pixel data 320 contains K' pixel data 320a representing the pixel value of K' (black). Note that the K pixel data 310d is the pixel value of black after color conversion using the color profile 307a, while the K' pixel data 320a is the pixel value of black after color conversion using the monochrome profile 307b. Thus, the values are different from each other, as a matter of course.

The determining unit 33 integrates, for each page, the number of color-monochrome determination flags each representing a color pixel in the determination image data 330 generated by the determination image data generating unit 31, and determines that a color image is to be outputted if the integrated number of color-monochrome determination flags each representing a color pixel exceeds a predetermined threshold cth.

If the determining unit 33 determines that a color image is to be outputted, the image generating unit 35 generates color image data by extracting the C pixel data 310a, the M pixel data 310b, the Y pixel data 310c, and the K pixel data 310d on each pixel, and converting them into drop data based on gradations ranging from 0 to 5 so that the inkjet heads 110 can eject the inks.

Moreover, if the determining unit 33 determines that a monochrome image is to be outputted, the image generating unit 35 generates monochrome image data by extracting the K' pixel data 320a on each pixel and converting them into drop data based on the gradations ranging from 0 to 5 so that the inkjet head 110 can eject the ink.

As described above, in the image processing apparatus 100A according to Embodiment 2, the determination image data generating unit 31 extracts the color-monochrome determination flags corresponding to the color profile conversion pixel data from the profile stored in the storage unit 307, and generates determination image data containing the color profile conversion pixel data, the monochrome profile conversion pixel data, and the extracted color-monochrome determination flags. The determining unit 33 determines, for each page, that a color image is to be outputted if the number of color-monochrome determination flags each representing a color pixel, among the color-monochrome determination flags contained in the determination image data generated by the determination image data generating unit 31, exceeds the predetermined threshold cth. In this way, it is not necessary to determine for each page which one of a color image and a monochrome image to output, based on the color profile conversion pixel data. Thus, the time required to output print image data can be shortened further.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum. effects achieved by the present invention. Hence, the effects of the present invention are not limited to those described in the embodiment of the present invention.

What is claimed is:

1. An image processing apparatus comprising:
    a storage that stores instructions, a color profile for generating color pixel data on each pixel based on print job data containing an instruction for a printing apparatus to perform an auto-color output for performing a color output or a monochrome output, and a monochrome profile for generating monochrome pixel data on each of the pixels based on the print job data;
    a processor that, when executing the instructions stored in the storage, performs a process comprising:
    generating color pixel data on each of the pixels for each of color components based on the print job data by using the color profile stored in the storage;
    generating monochrome pixel data on each of the pixels based on the print job data by using the monochrome profile stored in the storage;
    generating determination image data containing the generated color pixel data on each of the pixels and the generated monochrome pixel data on each of the pixels;
    determining, for each page, which of the color output and the monochrome output is to be performed based on a color intensity of the generated determination image data;
    generating color image data for the color output by the printing apparatus by extracting the generated color pixel data on each of the pixels for each of the color components, upon determination that the color output is to be performed; and
    generating monochrome image data for the monochrome output by the printing apparatus by extracting the generated monochrome pixel data on each of the pixels, upon determination that the monochrome output is to be performed,
    wherein, for each of the pages, the processor performs a process, in the determining, comprising:
    for each of the pixels, making a comparison between pieces of color pixel data of the color components contained in the determination image data, and determining that the pixel is a color pixel upon at least two of pixel values of the color components being different from each other, and determining that the pixel is a monochrome pixel upon the pixel values of the color components being equal to each other, and
    determining that the color output is to be performed upon a number of the color pixels exceeding a threshold.

2. An image processing apparatus comprising:
a storage that stores instructions, a color profile for generating color pixel data on each pixel based on print job data containing an instruction for a printing apparatus to perform an auto-color output for performing a color output or a monochrome output, and a monochrome profile for generating monochrome pixel data on each of the pixels based on the print job data;
a processor that, when executing the instructions stored in the storage, performs a process comprising:
generating color pixel data on each of the pixels for each of color components based on the print job data by using the color profile stored in the storage:
generating monochrome pixel data on each of the pixels based on the print job data by using the monochrome profile stored in the storage;
generating determination image data containing generated color pixel data on each of the pixels and the generated monochrome pixel data on each of the pixels;
determining, for each page, which of the color output and the monochrome output is to be performed based on a color intensity of the generated determination image data;
generating color image data for the color output by the printing apparatus by extracting the generated color pixel data on each of the pixels for each of the color components, upon determination that the color output is to be performed; and
generating monochrome image data for the monochrome output by the printing apparatus by extracting the generated monochrome pixel data on each of the pixels, upon determination that the monochrome output is to be performed,
wherein
the storage stores the color profile, the monochrome profile, and color-monochrome determination flags in association with each other, the color-monochrome determination flags each indicating whether the color profile is a color pixel or a monochrome pixel,
the processor performs a process, in the generation of the determination image data, comprising:
extracting, from the storage, the color-monochrome determination flags corresponding to the generated color pixel data on the pixels, and
generating the determination image data containing the extracted color-monochrome determination flags in addition to the generated color pixel data on the pixels and the generated monochrome pixel data on the pixels, and
the processor performs a process in the determining, comprising:
determining, for each of the pages, that the color output is to be performed upon a number of color-monochrome determination flags, each representing the color pixel among the color-monochrome determination flags contained in the generated determination image data, exceeding a threshold.

3. An image processing apparatus comprising:
a printer;
a storage that stores instructions, a color profile for generating color pixel data on each pixel based on print job data, and a monochrome profile for generating monochrome pixel data on each of the pixels based on the print job data, the print job data containing an instruction for the printer to perform auto-color output for performing a color output or a monochrome output; and
a processor that, when executing the instructions stored in the storage, performs a process comprising:
receiving the print job data;
generating color pixel data on each of the pixels for each of color components based on the received print job data by using the color profile stored in the storage;
generating monochrome pixel data on each of the pixels based on the received print job data by using the monochrome profile stored in the storage;
generating determination image data containing the generated color pixel data on each of the pixels and the generated monochrome pixel data on each of the pixels;
determining, for each page, which of the color output and the monochrome output is to be performed based on a color intensity of the generated determination image data; and
generating color image data for the color output by the printer, by extracting the generated color pixel data on each of the pixels for each of the color components upon determination that the color output is to be performed;
generating monochrome image data for the monochrome output by the printer by extracting the generated monochrome pixel data on each of the pixels upon determination that the monochrome output is to be performed; and
driving the printer to perform the color output or the monochrome output based on the generated color image data or the generated monochrome image data,
wherein, for each of the pages, the processor performs a process, in the determining, comprising:
for each of the pixels, making a comparison between pieces of color pixel data of the color components contained in the determination image data, and determining that the pixel is a color pixel upon at least two of pixel values of the color components being different from each other, and determining that the pixel is a monochrome pixel upon the pixel values of the color components being equal to each other, and
determining that the color output is to be performed upon a number of the color pixels exceeding a threshold.

4. An image processing apparatus comprising:
a printer;
a storage that stores instructions, a color profile for generating color pixel data on each pixel based on print job data, and a monochrome profile for generating monochrome pixel data on each of the pixels based on the print job data, the print job data containing an instruction for the printer to perform auto-color output for performing a color output or a monochrome output; and
a processor that, when executing the instructions stored in the storage, performs a process comprising:
receiving the print job data;
generating color pixel data on each of the pixels for each of color components based on the received print job data by using the color profile stored in the storage;
generating monochrome pixel data on each of the pixels based on the received print job data by using the monochrome profile stored in the storage;
generating determination image data containing the generated color pixel data on each of the pixels and the generated monochrome pixel data on each of the pixels;
determining, for each page, which of the color output and the monochrome output is to be performed based on a color intensity of the generated determination image data; and
generating color image data for the color output by the printer, by extracting the generated color pixel data on each of the pixels for each of the color components upon determination that the color output is to be performed;

generating monochrome image data for the monochrome output by the printer by extracting the generated monochrome pixel data on each of the pixels upon determination that the monochrome output is to be performed; and driving the printer to perform the color output or the monochrome output based on the generated color image data or the generated monochrome image data, wherein the storage stores the color profile, the monochrome profile, and color-monochrome determination flags in association with each other, the color-monochrome determination flags each indicating whether the color profile is a color pixel or a monochrome pixel, the processor performs a process, in the generation of the determination image data, comprising:

extracting, from the storage, the color-monochrome determination flags corresponding to the generated color pixel data on the pixels, and generating the determination image data containing the extracted color-monochrome determination flags in addition to the generated color pixel data on the pixels and the generated monochrome pixel data on the pixels, and the processor performs a process in the determining, comprising:

determining, for each of the pages, that the color output is to be performed upon a number of color-monochrome determination flags, each representing the color pixel among the color-monochrome determination flags contained in the generated determination image data, exceeding a threshold.

* * * * *